FOOT RESTS FOR KAYAKS

This invention relates to a new type of foot rest for kayaks. The object of this invention is to provide a superior, safe foot rest, quick and easy to adjust, and easy to install in the kayak.

When paddling through turbulent water, whether down rivers (commonly known as white water), on lakes or ocean, kayakers keep their feet on foot rests, with knees braced up against the under side of the deck of the kayak. This is done to stabilize the kayak, and to keep the paddler from dropping out in case of a capsize. Dropping out of the kayak disqualifies contestants in all slalom kayak competitions.

This foot rest for kayaks is light in weight, being made up of four different aluminum extrusions. Easy, quick adjustment can be made with one hand, even without looking. The foot pad unit can not drop out or be lost.

Foot rests are always used in pairs; one for each side of the kayak, inside, in the location where the kayaker's feet are when paddling.

In the drawing:

FIG. 1 is a side longitudinal view of the assembled foot rest.

FIG. 2 is a view similar to FIG. 1, showing easy adjustment of the foot pad unit by depressing the spring-actuated trigger with the fingers, thus raising the indexing pin and moving the foot pad forward or backward, then releasing the indexing pin into the desired slot of the channel.

FIG. 5 is an end elevational view of the foot pad assembly.

FIG. 6 is an enlarged elevational view of the spring-actuated trigger, with indexing pin.

FIG. 7 is a side view of the foot rest assembly, and the elements thereof being in a pre-assembled position.

Figure 3:
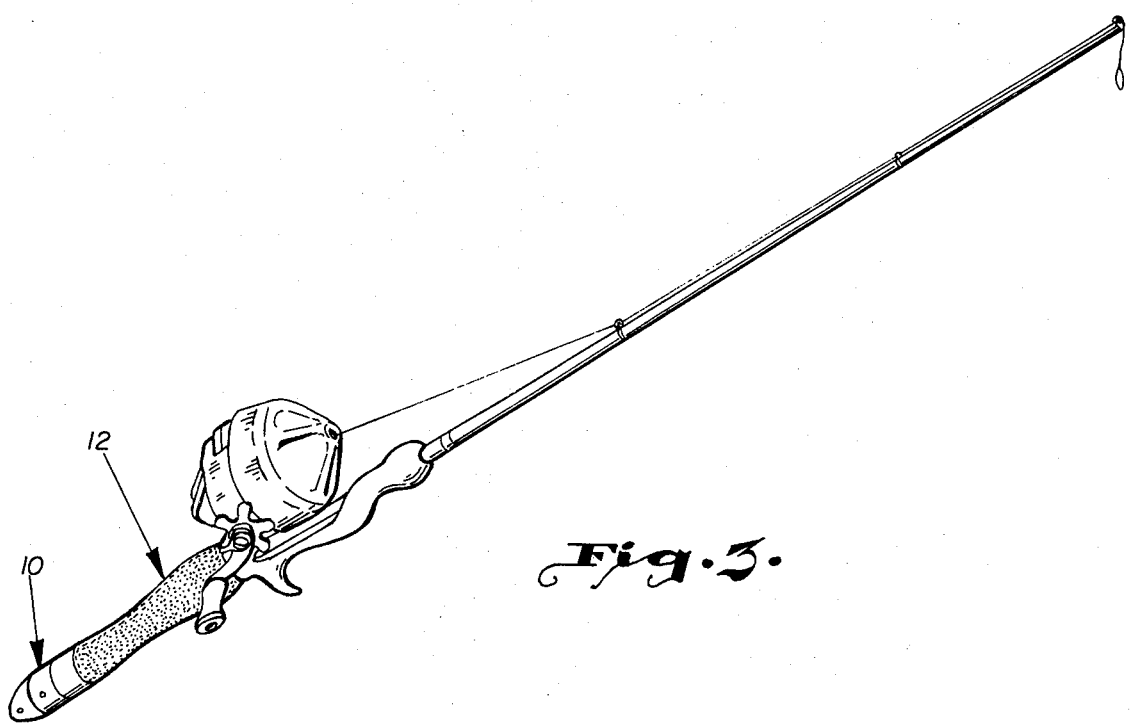
FIG. 3 is an end view of the channel showing the inverted T-slot.
Figure 4:
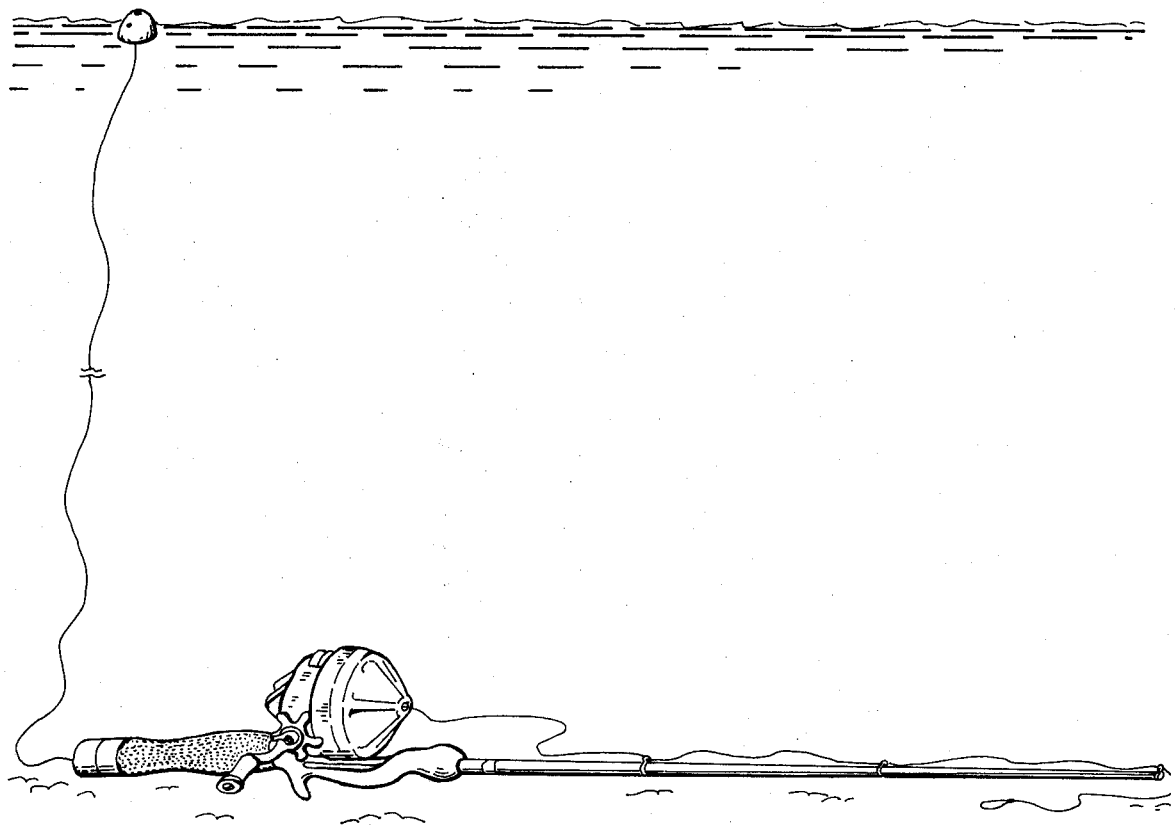
FIG. 4 is a front elevational view of the foot pad assembly, and the elements thereof being in pre-assembled position.

By referring to the drawings in detail, it will be seen that a channel member 10, with slots 11 is provided for indexing, along which the foot pad unit 12 is slidably adjusted. This channel member 10 is designed with an inverted T-slot 13 along its base. This T-slot 13, visable in FIG. 3, serves as a track along which the foot pad unit 12 moves as it is slidably adjusted.

The foot pad unit 12 is made up of an extrusion generally described as a hollow I-beam 14, a foot pad or rest 12a, attached to the I-beam 14 with rivets or screws 15, and a spring-actuated trigger 16 with pin 19 for adjusting and indexing the foot pad unit 12 along channel member 10. A rubber pad 17 is cemented to the foot pad 12a to provide a non-skid as well as comfortable surface for the foot. The trigger 16 is comprised of the main L-shaped part, a spring 18 inserted in the back of the trigger 16 for the purpose of compressing the pin 19 into the indexing slots 11, thus holding the foot pad unit 12 firmly in the desired position. The spring 18 is inserted in the trigger 16 for the purpose of exerting a downward pressure on the pin 19. The pin 19 is inserted at the lower end of the trigger 16 to hold the foot pad unit 12 in place after it has been adjusted. Containment screws 20 are provided at each end of the channel member 10 to keep the foot pad unit 12 from sliding out of either end of the channel member 10. By depressing trigger 16, as illustrated in FIG. 2, the indexing pin 19 is raised, permitting the foot pad unit 12 to be moved forward or backward, to accommodate the leg length of taller or shorter kayakers. By releasing the spring-loaded trigger 16, the indexing pin 19 will automatically be pressed into the indexing slot 11. Countersunk holes 21 are provided for the purpose of allowing the adhesives used in installation to penetrate the flanges of the channel member 10 to better secure the channel member 10 to the side of the kayak.

Having described the invention, what is claimed as new is:

1. A foot rest assembly for kayaks, comprising a pair of foot rest units, one unit adapted to be secured to each side of the hull inside the front of the kayak, each unit comprising a base and a pair of channel members with longitudinally spaced indexing slots, the members rising upwardly from the base and forming an inverted T-slot, said members serving as a track and support for a foot pad assembly, the foot pad assembly comprising a hollow I-beam supporting a foot pad and a spring-actuated trigger connected to an indexing pin, said pin being adapted to engage a given pair of indexing slots.

2. The foot rest assembly of claim 1, wherein the trigger includes an integrally connected spring which, in conjunction with the indexing pin, permits the foot pad assembly to be quickly moved along the lengths of the channel members when the trigger is depressed and the indexing pin is lifted, and to be held firmly in place when the trigger is released and the indexing pin is forced by the spring into the desired indexing slots, thereby accommodating the different leg lengths of kayakers.

3. The foot rest assembly of claim 1, wherein the sides of the base extend outwardly to form flanges in which holes are countersunk to facilitate the addition of adhesives.

4. The foot rest assembly of claim 1, wherein containment screws are provided at each end of a pair of channel members to keep the foot pad assembly from sliding out of the T-slot.

* * * * *

United States Patent [19]

Hicken

[11] 3,982,294

[45] Sept. 28, 1976

[54] RETRIEVER

[76] Inventor: Emerald W. Hicken, 236 E. El Paso, Broken Arrow, Okla. 74012

[22] Filed: Oct. 9, 1975

[21] Appl. No.: 621,210

[52] U.S. Cl............................................ 9/9; 43/25
[51] Int. Cl.² ....................................... B63C 7/26
[58] Field of Search....................... 9/9, 8 R; 43/25; 116/124 B

[56] References Cited
UNITED STATES PATENTS

| | | | |
|---|---|---|---|
| 1,719,838 | 7/1929 | Haselton | 9/9 |
| 2,190,531 | 2/1940 | Kabosky et al. | 9/9 X |
| 2,479,021 | 8/1949 | Perkins | 9/9 |
| 2,528,799 | 11/1950 | Strong | 9/9 |
| 3,105,980 | 10/1963 | Hinman | 9/9 |
| 3,303,521 | 2/1967 | Mix | 9/9 |
| 3,334,364 | 8/1967 | Foss | 9/9 |
| 3,624,849 | 12/1971 | Brannaker | 9/9 |

*Primary Examiner*—George E. A. Halvosa
*Assistant Examiner*—Gregory W. O'Connor

[57] ABSTRACT

A retriever device for locating a submerged object comprises a base member axially threaded with left hand threads, a spool positionable upon the base member and internally axially threaded with left hand threads, a screw member having contiguous right and left hand threads and holding the spool and the base member in secure position against the object, a retaining member mounted on the base member and including a transverse partition with an axial opening, a float member secured to the retaining member by a water-soluble adhesive means, and including attachment means for a line, and a line attached to the float to secure the float to the spool, and passing through the axial opening of the retaining member in order to be windable around the spool. The device of this invention is also intended to include a gas-generating tablet positionable upon the flat upper surface of the partition of the retaining member. The retaining member is intended to include a passageway fillable with water-soluble material which will, after being submerged in water for a while, dissolve and permit water to enter the internal portion of the device to react with the chemical and assist in separating the float member from the base member.

7 Claims, 4 Drawing Figures

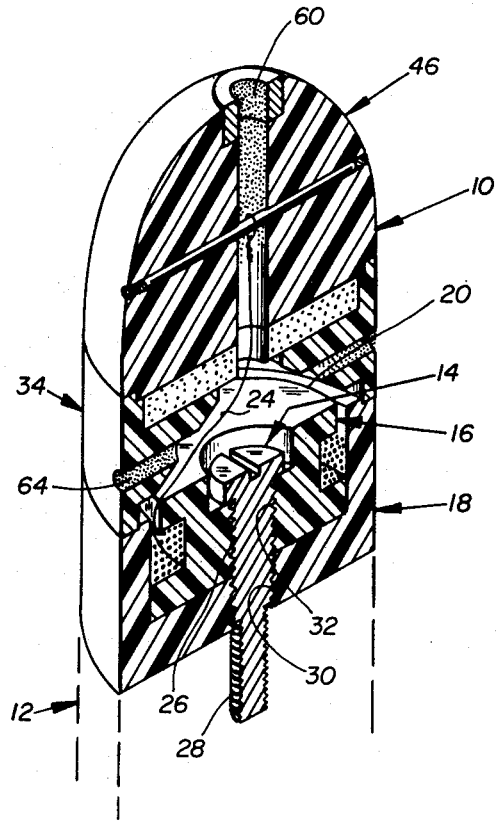

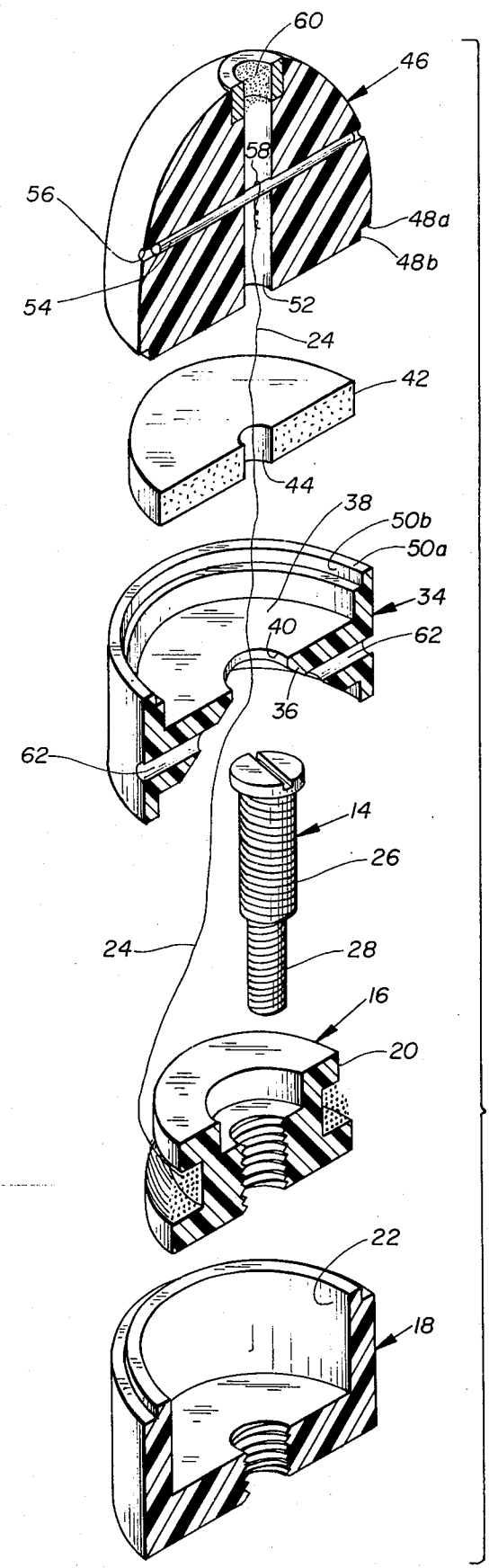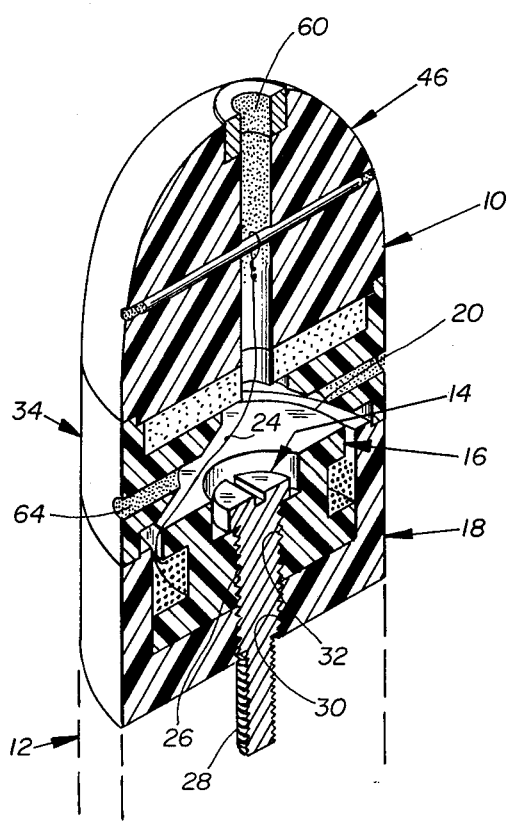
Fig. 1.
Fig. 2.